Figure 1:
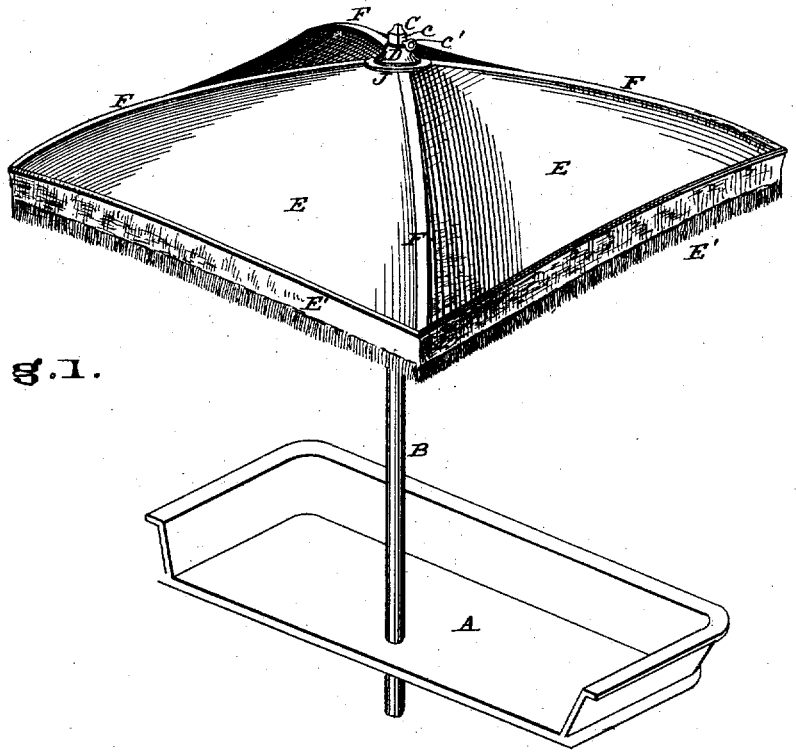

2 Sheets—Sheet 1.

G. BOCKSTALLER.

UMBRELLAS.

No. 7,265. Reissued Aug. 15, 1876.

ATTEST.

Robert Burns.
Le Blond Burdett

INVENTOR

Georg Bockstaller
By Knight Bros.
Attys.

N. PETERS, PHOTO-LITHOGRAPHER, WASHINGTON, D. C.

G. BOCKSTALLER.

UMBRELLAS.

No. 7,265. Reissued Aug. 15, 1876

ATTEST,

Robert Gurney
Le Blond Burdett

INVENTOR,

Georg Bocketaller
By Knight Bros
Attys.

N. PETERS, PHOTO-LITHOGRAPHER, WASHINGTON, D. C.

UNITED STATES PATENT OFFICE.

GEORG BOCKSTALLER, OF ST. LOUIS, MISSOURI, ASSIGNOR OF ONE-HALF INTEREST TO JULIUS STEINER, OF SAME PLACE.

IMPROVEMENT IN UMBRELLAS.

Specification forming part of Letters Patent No. 172,380, dated January 18, 1876; reissue No. 7,265, dated August 15, 1876; application filed May 27, 1876.

*To all whom it may concern:*

Be it known that I, GEORG BOCKSTALLER, of the city and county of St. Louis, and State of Missouri, have invented certain new and useful Improvements in Umbrellas for Wagons, &c., of which the following is a full, clear, and exact description, reference being had to the accompanying drawings, making part of this specification.

Hitherto wagon-umbrellas have been constructed substantially in the same manner as ordinary umbrellas—that is, with a sufficient number of ribs to give them a form approaching nearly to circular—and as it is objectionable to have the umbrella-top project much beyond the side of the wagon-body, the umbrella had necessarily to be made of an area so small as to give only an inadequate protection from sun and rain; whereas with my present improvement the top of the umbrella may be made the full width of the wagon-box from front to back of said top.

My improvement relates to an umbrella for vehicles, &c., made square so as to conform to the sides of the body, and it is designed to overcome the disadvantages of ordinary wagon-umbrellas.

The first part of my improvement consists in a four-sided or square umbrella provided with a four-ribbed frame, as a new article of manufacture.

The second part of my improvement consists in the combination of a square cover, having a square perforation for guiding the cover in position, a re-enforce band for said perforation, four ribs, pouches for receiving the outer ends of said ribs, and separate bearing-collar.

The third part of my improvement consists in the combination of a staff provided with a square top, forming flat sides, ribs having orifices at their inner ends, said ends being rounded and adapted to turn on said sides, and a ring for connecting the rib ends to the top of the umbrella.

The fourth part of my improvement relates to the construction of the brace-rods, and their connection to the slider and the ribs. Each of the brace-rods is formed of a single piece, bent at the outer end, so as to form the pintle of the hinge-connection to the rib, and extending from the rib to the slider in two parallel bars, whose ends are turned into eyes resting in distinct recesses of the slider, and retained by the usual ring-wire passing through the eyes.

The fifth part of my improvement consists in the manner of construction of the ribs. This is made broad from end to end, and rounded upon its top, so as to neither strain, wear, or tear the cover. Though the ribs have the same breadth throughout their whole length, they taper toward the end or ends in thickness. Each rib is connected to the bent outer end of the brace-rod by a clip, which extends around the rib, and whose ends form eye-lugs, through which the said part of the brace-rod passes.

Figure 2:
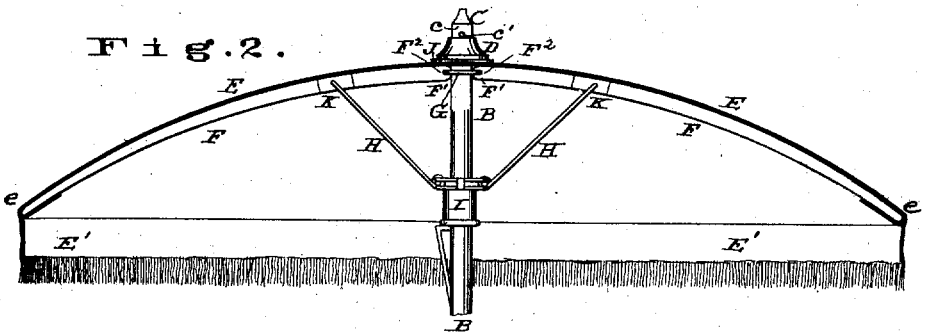
Figure 3:
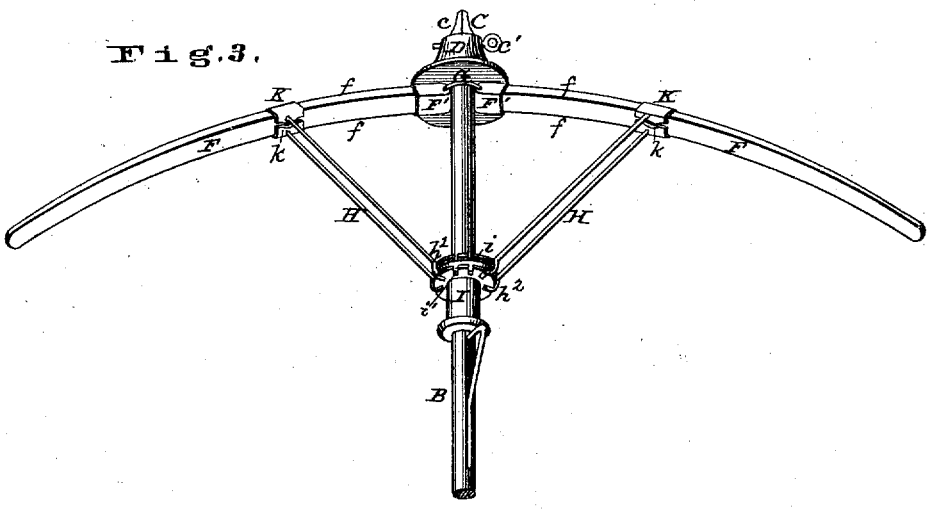
Figure 4:
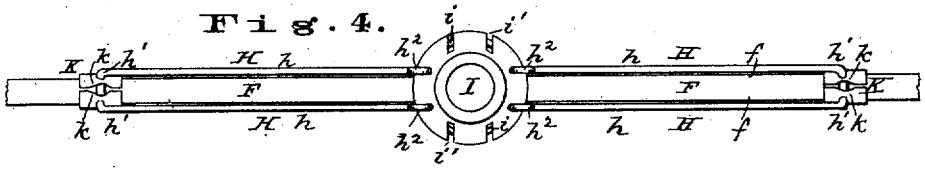

Figure 1 is a top perspective view of the umbrella. Fig. 2 is a diagonal section. Fig. 3 is an under perspective view of two ribs, curved, in the position they occupy in a spread umbrella. Fig. 4 is an under view of the brace-rods enlarged, with an under view of the inner portions of two ribs, showing also an end view of the slider.

A is the wagon-seat, through which passes the staff B of the umbrella. The top C of the staff passes through the collar D at the center of the cover E. The cover E is square in form, as shown, and is supported on four ribs, F, adapted to be raised or lowered. The inner ends $F^1$ of the ribs are rounded, so as to enable them to turn easily on the flat spots *c* of the square top C, and are held to the staff by ring G passing through orifices $F^2$. This construction forms a superior and simple mode of attaching the inner ends of the ribs. The ribs are connected between their ends, by rods H, (composed each of parallel bars *h h*,) to the slider I.

The cover has, preferably, a hanging border, E′, and is held on the frame by inserting the ends of the ribs into pouches *e*, at the corners, which may be readily done when the ribs are down close to the staff. This arrangement allows the cover to be removed from the frame by merely drawing the ends of the ribs from their pouches or pockets, and drawing out the pin *c′*, passing through the top C of the staff.

The ribs may be made of wood or metal or other suitable substance. I prefer wood as being cheap, and not liable to rust or cut the cover. The under side of the collar D receives the upward pressure of the inner ends $F^1$ of the ribs. The cover has a square hole, to adapt it to fit the top C, and is re-enforced by a band, J, of any suitable material. I prefer to make the cover of a single square piece, E, to which the pendent margin or border E′ is added; but, if preferred, the cover may have a seam over one or more of the ribs.

It will be seen that by making the top C of square form, the parts are readily guided into position when putting them together. The ribs F are jointed to the staff B at $F^1$, so as to be capable of rising and falling as usual. K is a clip secured to the rib, and whose ends, *k k*, have perforations, through which the brace-rod passes, to form the hinge connection between the rod and the rib. The brace-rod H, where it passes through the end lugs *k* of the clip, has an angular return-bend, $h^1$. The bearing-eyes of lugs *k k* are so far apart as to constitute, with the brace-rod, a well-braced joint that holds the parts steadily in their proper relative positions; and the width of the ribs, besides furnishing a broad bearing for the hinge-lugs, acts directly to prevent the ribs from springing sidewise, which they are liable to do when made round or square in transverse section, as usual. The inner ends of the brace-rod H are turned into eyes $h^2$, to engage on the wire ring *i* lying in the circumferential groove of the slider I. The slider has at its edge recesses *i′*, into which the eye-formed ends $h^2$ fit neatly, each eye occupying a separate recess, so that these eyes or ends are restrained from side movement and confined to their proper vertical movement as the brace-rods turn on their eyes in the rising and falling of the cover. The ends $h^2$ $h^1$ of each brace-rod are set so far apart as to give a broad and steady bearing at the inner end where hinged to the slider. The ribs are made broad from *f* to *f*, which edges *f f* are parallel from end to end. In the opposite direction—that is, in thickness—the ribs are made thinner toward the point. These ribs give a broad bearing beneath the cover E, and, consequently, there is little strain upon the cover, or liability to cut or wear it. By use of the clip or plate K I avoid the necessity of perforating the rib for the passage of the brace-rod H, as is usual in all ribs made of soft material; and thus the ribs are not weakened at that point.

I claim herein as new and of my invention—

1. As a new article of manufacture, the four-sided or square umbrella for vehicles, provided with a four-ribbed frame, substantially as and for the purpose set forth.

2. The combination of a square cover, E, having square perforation, re-enforce-band J, and pouches *e*, with the four ribs F, and separate bearing-collar D, substantially as and for the purpose set forth.

3. The brace H composed of two parallel bars, *h h*, having eyes $h^2$ $h^2$, in combination with the slider I, having separate recesses *i* for each eye or end $h^2$, substantially as set forth.

4. The combination of staff B, provided with square top C, forming the flat sides *c*, ribs F, having orifices $F^2$ and rounded ends $F^1$, adapted to turn on said sides *c*, and the ring G holding said ends to said top, as and for the purpose set forth.

5. The brace H composed of two parallel bars, *h h*, with eyes $h^2$ $h^2$ and return-bend $h^1$, and combined with the slider I, having separate recesses *i*, one for each end or eye $h^2$ $h^2$, substantially as set forth.

6. The broad rib F, in combination with the double brace *l′ l′* and runner I, substantially as set forth.

GEORG BOCKSTALLER.

Witnesses:

SAML. KNIGHT,

ROBERT BURNS.